T. J. HARRISON.
SEED POTATO CUTTER.
APPLICATION FILED JUNE 10, 1914.
1,154,765.
Patented Sept. 28, 1915.
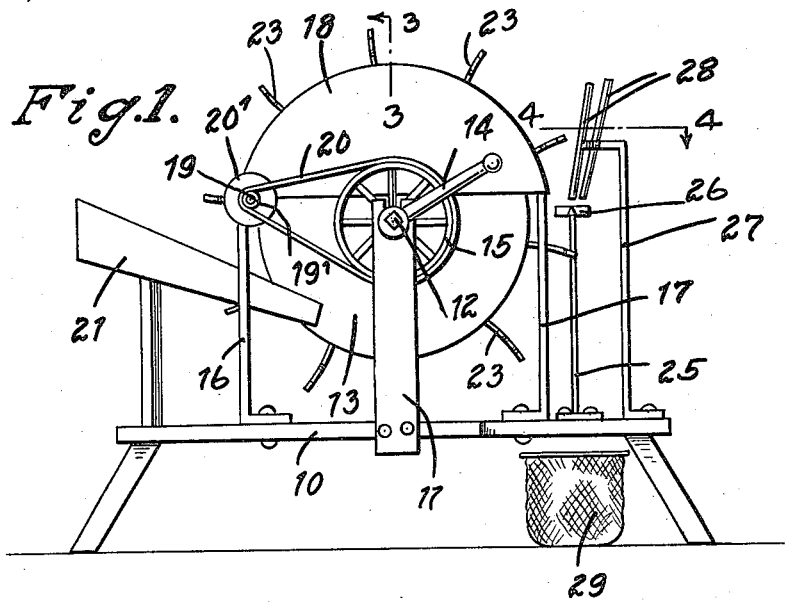
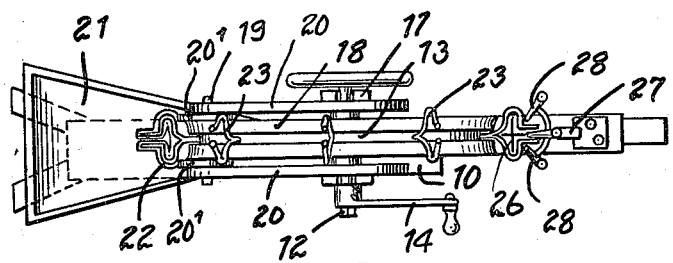
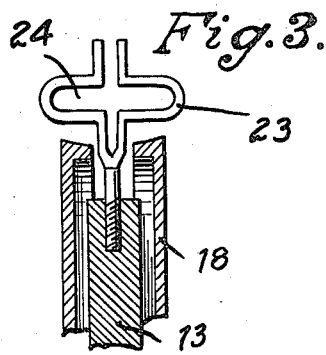
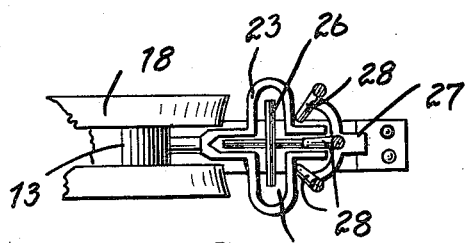
Witnesses
M. S. Watson
Harry M. Test
Inventor
T. J. Harrison
By
Attorneys 1,154,765. Specification of Letters Patent. Patented Sept. 28, 1915.

Application filed June 10, 1914. Serial No. 844,266.

UNITED STATES PATENT OFFICE.

THOMAS J. HARRISON, OF JULESBURG, COLORADO.

SEED-POTATO CUTTER.

*To all whom it may concern:*

Be it known that I, THOMAS J. HARRISON, a citizen of the United States, residing at Julesburg, in the county of Sedgwick, State of Colorado, have invented certain new and useful Improvements in Seed-Potato Cutters; and I do hereby declare the following to be a full, clear, and exact description of the invention, such as will enable others skilled in the art to which it appertains to make and use the same.

This invention relates to improvements in vegetable cutting machines and particularly to machines for cutting potatoes into a number of parts for the purpose of planting.

The principal object of the invention is to provide a simple and novel means for carrying potatoes from a suitable hopper and forcing them onto a knife which cuts them simultaneously into a plurality of pieces.

Another object is to provide means for guiding the potatoes so that they do not come in contact with the carrying element.

Other objects and advantages will be apparent from the following description, when taken in connection with the accompanying drawings.

In the drawings: Figure 1 is a side elevation of a potato seed cutter made in accordance with my invention. Fig. 2 is a top plan view. Fig. 3 is a vertical section on the line 3—3 of Fig. 1, slightly enlarged. Fig. 4 is an enlarged horizontal fragmentary section on the line 4—4 of Fig. 1.

Referring particularly to the accompanying drawings, 10 represents a suitable supported table which carries the uprights 11, and in these uprights is journaled a transverse shaft 12 on which is mounted a rotatable drum 13. One end of the shaft is provided with a crank handle 14 and adjacent the handle and on the shaft is a belt wheel 15. Arranged at the front and rear of the drum are the supports 16 and 17, these supports carrying an upwardly arched and longitudinally slotted guard or guide plate 18 disposed over the upper half of the drum and suitably spaced thereabove. On the upper end of the supports 16 and the guide 18 are stub shafts 19 on one of which is mounted a pulley 19' and trained around this pulley and the pulley 15 is a belt 20. While I have shown one pulley 15, one pulley 19' and one belt 20, it will be understood that I may duplicate the pulleys and belt on the other side of the machine. On each of the shafts 19 is a wheel 20' which insures that only one potato will be lifted by each carrier which will be later described. Below the pulley 19 is a suitable chute 21 in which potatoes are dumped and permitted to run toward the drum. In the lower end of the bottom of this chute is a cruciform opening 22. Mounted on the drum 13 and extending radially therefrom are the picker elements 23, the stems of which pass through the slot of the guard plate 18 as the drum is rotated and have the cruciform openings 24 in their portions above the guard plate. One portion of this cruciform opening of the picker opens through the end of the picker for a purpose which will hereinafter appear. At the opposite side of the drum is a standard 25 on the upper end of which is mounted the cruciform knife 26 so disposed that the apertured portions of the pickers will pass over said knife and the standard 25 be permitted to pass through the portion of said opening which extends through the end of the picker. This permits the picker to pass over the knife and then pass beyond it and up through the opening 22 in the chute, to pick up another potato. On a wall 27 mounted beyond the knife 26 is arranged a plurality of spring fingers 28 which direct the potatoes onto the knife 26 as they are brought down by the pickers.

When the hopper or chute 21 contains potatoes and the drum 13 is rotated by means of the crank 14, each of the pickers will pass through the opening of the chute and carry a potato up on top of the guard plate 18 and carry the same around to the knife 26, the picker pressing the potato onto the knife and causing the knife to cut the potato into four pieces. The picker then passes beyond the knife and the pieces of potato fall into a suitable receptacle 29 disposed below the table. Should one of the carriers pick up more than one potato, all but one would be brushed from the carrier by the wheels 20.

Particular attention is called to the guard plate 18 which assists in guiding the potatoes over the drum and prevents them being wedged in any part of the apparatus. It will be noted that the arched portion of the guard is convexed so that the potatoes will not roll off as they are carried toward the knife 26.

What is claimed is:

A seed potato cutter comprising a rotatable drum having radially extending potato lifters and carriers, a pair of arcuate plates disposed on opposite sides of the upper portion of the drum and having their curved edges inclined inwardly, a knife on which the carriers force the potatoes to cut them in pieces, means for guiding the potatoes on to the knife, a pair of rotatable disks disposed at the entrance end of the device, for engagement with the potatoes lifted by the carriers to brush off all but one of the potatoes and means for simultaneously driving the drum and the disks.

In testimony whereof, I affix my signature, in the presence of two witnesses.

THOMAS J. HARRISON.

Witnesses:
 E. F. CLAYTON,
 C. H. BROCK.

Copies of this patent may be obtained for five cents each, by addressing the "Commissioner of Patents. Washington, D. C."